United States Patent [19]

Schafer et al.

[11] 4,343,264
[45] Aug. 10, 1982

[54] ANIMAL WATERING APPARATUS

[76] Inventors: Kenneth L. Schafer, Rte. 3, Box 73, Le Sueur, Minn. 56058; Maurice L. Peterson, Kerkhoven, Minn. 56252

[21] Appl. No.: 159,812

[22] Filed: Jun. 16, 1980

[51] Int. Cl.³ .............................................. A01K 7/02
[52] U.S. Cl. .................................................... 119/73
[58] Field of Search ..................... 119/72, 73, 74, 75, 119/78

[56] References Cited

U.S. PATENT DOCUMENTS

| | | | |
|---|---|---|---|
| 226,812 | 4/1880 | Warren | 119/79 |
| 232,077 | 9/1880 | Shaw et al. | 119/78 |
| 351,781 | 11/1886 | Kouns | 119/73 |
| 642,952 | 2/1900 | Bess | 119/79 |
| 648,953 | 5/1900 | Hanson | 119/73 X |
| 669,415 | 3/1901 | Jacobs | 119/73 |
| 1,028,998 | 6/1912 | Eaton | 119/73 |
| 1,037,093 | 8/1912 | Wendorf et al. | 119/72 |
| 1,228,230 | 5/1917 | Muller | 119/73 |
| 1,240,785 | 9/1917 | Shaw | 119/73 |
| 1,274,894 | 8/1918 | Kirby | 119/78 |
| 1,329,939 | 2/1920 | Todd | 119/73 |
| 1,337,075 | 4/1920 | Johnson | 119/73 |
| 1,359,885 | 11/1920 | Fullerton | 119/73 |
| 1,372,188 | 3/1921 | Paulson | 119/73 |
| 1,375,039 | 4/1921 | Eaton | 119/73 |
| 1,402,953 | 1/1922 | Pagel | 119/73 |
| 1,477,447 | 6/1922 | Ritchie | 119/80 |
| 1,560,088 | 11/1925 | Marquardt | 119/73 X |
| 1,663,789 | 3/1928 | Anderson | 119/73 |
| 1,725,628 | 8/1929 | Gerhardt | 119/78 |
| 1,824,154 | 9/1931 | Johnson et al. | 119/73 |
| 1,835,352 | 12/1931 | Stangl | 119/73 |
| 1,900,604 | 3/1933 | Gustafson | 119/78 |
| 1,989,477 | 1/1935 | Ferris | 119/75 |
| 2,087,173 | 7/1937 | Uden | 137/68 |
| 2,164,716 | 7/1939 | Kreft | 119/73 |
| 2,252,623 | 8/1941 | Gerken | 119/73 |
| 2,358,303 | 9/1944 | Byers | 119/73 |
| 2,466,135 | 4/1949 | Townsend | 119/73 |
| 2,629,040 | 2/1953 | Smith | 119/73 |
| 2,635,580 | 4/1953 | Donahoe et al. | 119/73 |
| 2,963,568 | 12/1960 | Tellefson | 219/38 |
| 2,990,809 | 7/1961 | Phillips | 119/78 |
| 3,027,872 | 4/1962 | Nelson | 119/81 |
| 3,106,189 | 10/1963 | Kopps | 119/73 |
| 3,371,652 | 3/1968 | Louks et al. | 119/51.11 |
| 3,745,977 | 7/1973 | Martin | 119/73 |
| 3,759,228 | 9/1973 | Keen | 119/79 |
| 3,835,882 | 9/1974 | Barker et al. | 137/445 |
| 3,841,268 | 10/1974 | Bunger | 119/73 |
| 3,943,889 | 3/1976 | Sparber | 119/73 |
| 4,003,340 | 1/1977 | Kuzara et al. | 119/73 |
| 4,100,885 | 7/1978 | Kapplinger | 119/73 |
| 4,130,090 | 12/1978 | Bohlmann | 119/73 |

OTHER PUBLICATIONS

M & H Equipment, Inc., Box 773, Sioux Falls, S.D., "The Hogger".
Ritchie Industries, Inc., Conrad, Iowa, "Relax Ritchie Waters 'em Right".

Primary Examiner—Gene Mancene
Assistant Examiner—Robert P. Swiatek
Attorney, Agent, or Firm—Burd, Bartz & Gutenkauf

[57] ABSTRACT

An animal watering apparatus including a tank having a water chamber enclosed by a top wall. A pair of drinking openings are located in the top wall and are closed respectively by a pair of covers. Water inlet to the water chamber comprises a water pipe extended to the upper portion of the chamber and having a float valve to maintain a preselected water level in the chamber. A pair of baffles extend downwardly from the inside surface of the top wall and isolate the float valve and water pipe outlet from the drinking openings such that when one or more of the covers are open, cold ambient air does not move across the surface of the water to the vicinity of the water inlet. Water coming in the water inlet is thus maintained at a relatively warmer temperature for a longer time. In periods of warmth, the water in the water chamber is maintained at a cooler temperature for a longer period of time.

33 Claims, 7 Drawing Figures

ANIMAL WATERING APPARATUS

SUMMARY OF THE INVENTION

The invention pertains to a watering apparatus to provide an outdoor, unattended source of drinking water for animals such as cattle and hogs. During the winter in cold climates, animal drinking water provided from conventional open sources such as a water trough is prone to freeze unless attended. Heating elements have been used with water tanks to prevent water from freezing. Likewise, water provided by natural sources such as a pond or spring is also prone to freezing. It is inconvenient to frequently attend such supply sources to keep them open, yet it is desirable that the animals have an uninterrupted supply of water to drink at will.

The present invention provides an unattended watering apparatus to furnish fresh water at an outdoor location to animals at all temperature conditions. The watering apparatus does not require auxiliary heating means, as gas or electric heaters. The invention includes an insulated water holding tank with a removable top wall. Water is stored in the tank chamber and is introduced into the chamber through a water inlet pipe. Drinking openings in the top wall are normally closed by covers which can be pivoted open by an animal to gain access to the water in the chamber. The water level in the chamber is maintained by a float valve assembly connected to the top of the inlet pipe. Float valve assembly permits water to flow through the inlet pipe responsive to a lowering of the water level by a drinking animal. A pair of dams or baffles extend downwardly from the inside surface of the top wall into the water in the tank in straddling relationship to the top of the inlet pipe and the float valve assembly to isolate them and the water in the immediate vicinity from the drinking openings. When one or more of the covers are open, cold air is not permitted to flow from the drinking opening across the water surface to the inlet pipe and float valve. The water entering the tank through the inlet pipe is isolated from the cold effects of the drinking openings and is maintained at a warmer temperature for a longer period of time. Bumper means are provided on the top wall to urge the covers back into closed relationship over the drinking openings once an animal has finished drinking and moves away. In one embodiment the cover is a two section flexible dome having adjacent edges which allow the dome to be opened by an animal to allow the animal to drink water.

DESCRIPTION OF PREFERRED EMBODIMENTS

Figure 1:
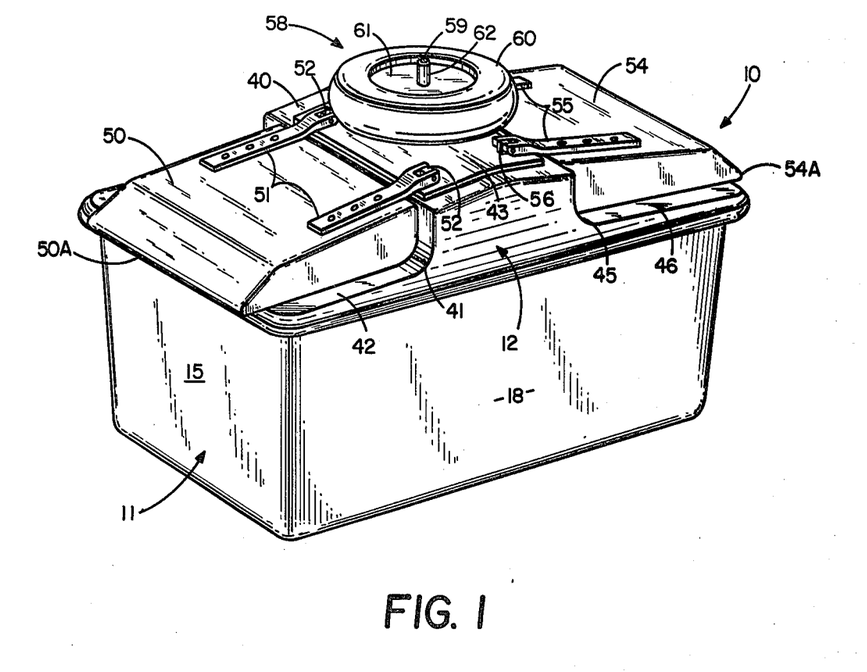
FIG. 1 is a perspective view of an animal watering apparatus of the invention.
Figure 2:
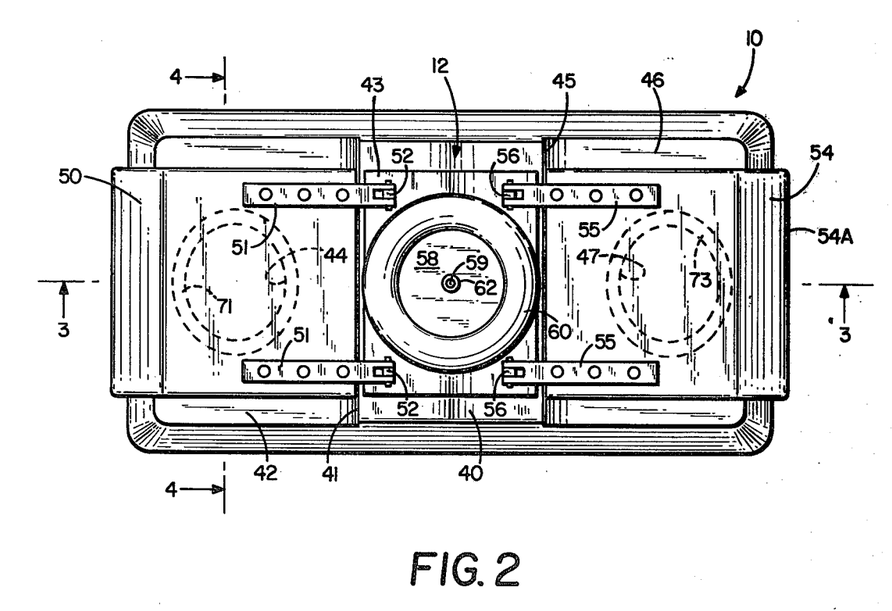
FIG. 2 is a top elevational view of the animal watering apparatus of FIG. 1.
Figure 3:
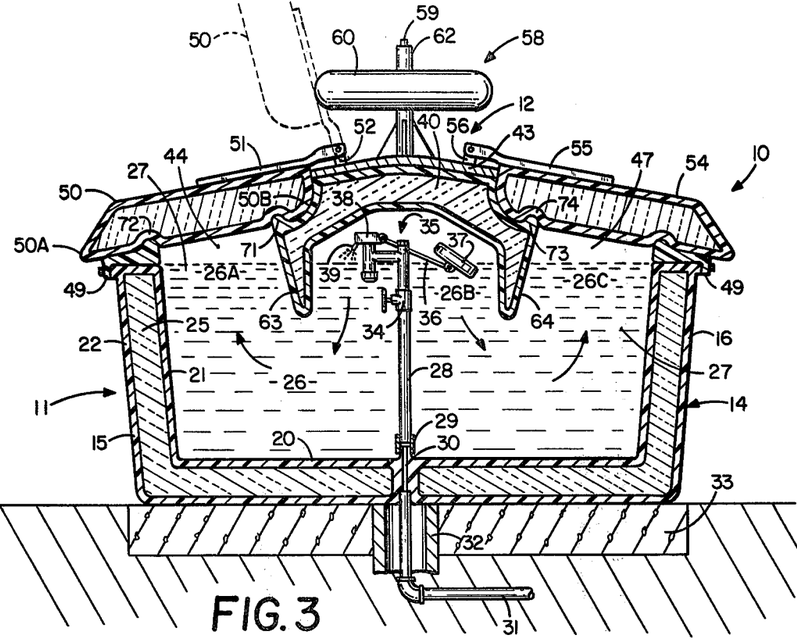
FIG. 3 is a sectional view of the animal watering apparatus of FIG. 2 taken along the line 3—3 thereof.

Referring to the drawings, there is shown an animal watering apparatus indicated generally at 10 to provide fresh water for animals such as cattle in an outdoor environment at all temperature conditions. Watering apparatus 10 includes a tank 11 having a removable top unit or wall 12 and a base or bottom unit 14. Base 14 is a generally rectangular upwardly open top box structure having upright end walls 15, 16 and upright sidewalls 17, 18 all integrally connected at their lower edges to a bottom wall 20. As shown in FIG. 3, the sidewalls 17, 18, end walls 15, 16, and bottom wall 20 can be formed of a first rectangularly shaped upwardly open molded plastic inner shell 21 and a second exterior rectangularly shaped molded plastic outer shell 22 spaced from the inner shell 21 and joined at their respective upper edges by a horizontal ledge 23. The space between the inner and exterior shells 21, 22 is filled with an insulative material such as a foamed plastic 25 of polystyrene or polyurethane or the like. The walls of base 11 define a chamber 26 for holding a supply of drinking water 27.

A water inlet pipe 28 extends upwardly from a coupling 29 connected to a tubular nipple 30 on bottom wall 20. A water pipe 31 extends from a location beneath the frost line in ground through a collar or conduit 32 located in a flat horizontal support slab 33 supporting watering apparatus 10 with respect to ground.

A hand operated On-Off valve 34 is attached to the upper end of pipe 28. A float valve assembly 35 is assembled to the upper end of valve 34 extended above the top edge of duct 28. Float valve 35 can be of any usual and preferred type, for example, like that shown in U.S. Pat. No. 3,835,882 to Barker et al. A float arm 36 is connected at an outer end to a float 37 which rests on the upper surface of water 27. The inner end of float arm 36 is connected to a valve body 38. As the level of water 27 drops beneath a preselected value upon consumption of water by animals, the float 37 moves downwardly along with the arm 36 to open the valve body 38 and permit discharge of water through a discharge nozzle 39. As the water level rises to the preselected level, float 37 and arm 36 are moved upwardly to close the valve body 28 and halt further discharge of water through the nozzle 39.

Figure 4:
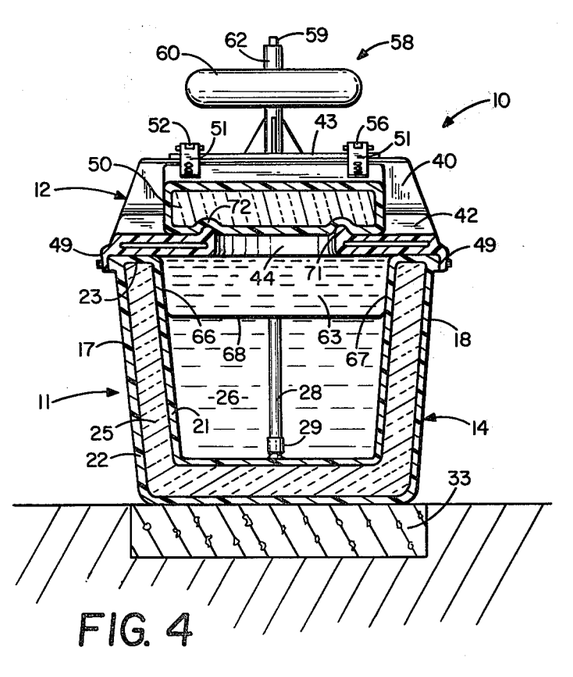
FIG. 4 is a sectional view of the animal watering apparatus of FIG. 2 taken along the line 4—4 thereof.

Top wall 12 has an insulated raised central portion 40 located midway between end walls 15, 16 of base 14 and extended transversely across base 14 between sidewalls 17, 18. Raised central portion 40 has a first inwardly curved shoulder 41. A first top end portion 42 extends from shoulder 41 to the upper edge of end wall 15 of base 14. First end portion 42 has a first generally round drinking opening or watering hole 44. Raised central portion 40 has a second curved shoulder 45 opposite first shoulder 41. A second top end portion 46 extends from second shoulder 45 to the upper edge of the other end wall 16 of base 14. Second end portion 46 has a second drinking opening or watering hole 47. As shown in FIG. 4, the outer edges of the central and end portions of top wall 12 have a downwardly curved lip 49 surrounding the top of the side and end walls 15, 16, 17 and 18 of base 11.

A first insulated lid or cover 50 covers the first drinking opening 44 on the first end portion 42 of top wall 12. Cover 50 has inner and outer skins or layers surrounding a core of insulation material, as foamed plastic.

Other types of insulation can be used for cover 50. Top wall 12 has an upwardly projected continuous rib 71 surrounding drinking opening 44. The inner skin of cover 50 has an upwardly directed groove 72 for accommodating rib 71 when cover 50 is in the closed position. Rib 71 and groove 72 provide a cover-to-tank seal to protect the water in the tank from outside air. Hinge straps 51 are fastened at one end to the upper surface of first cover 50 and extend to a plate 43 on the upper surface of raised central portion 40 of top wall 12. The opposite ends of hinge straps 51 are pivotally connected to hinge blocks 52 mounted on plate 43 attached to the upper surface of central portion 40. The first cover 50 is pivotal between position in covering relationship to the first drinking opening 44 shown in full lines in FIGS. 1 and 3, to a position clear of the first drinking opening 44, as shown in phantom in FIG. 3, whereby accessibility to the drinking opening 44 can be gained by an animal seeking water to drink. The lower interior end 50B of first cover 50 is curved so to fit with the first curved shoulder 41 of raised central portion 40. The lower outer corner 50A of first cover 50 extends outwardly from the upper edge of first end wall 15 in overlapping relationship thereto whereby an animal can use its nose to lift the first cover 50 from the closed toward the open position in order to gain access to the drinking opening 44. Animals such as cattle easily learn such a function in order to gain access to the water.

A second insulated lid or cover 54 covers the second drinking opening 47 on the second end portion 46 of top wall 12. Cover 54 is identical to cover 50. Top wall 12 has an upwardly projected continuous rib 73 surrounding opening 47. Cover 54 has a groove 74 for accommodating rib 73. Rib 73 and groove 74 provide a cover-to-tank seal to protect the water in the tank from outside air. Second cover 54 is disposed in symmetrical relationship to the first cover 50 and has hinge straps 55 fastened at one end to the upper surface thereof. The opposite ends of hinge straps 55 extend to the upper surface of raised central portion 40 and are pivotally connected to hinge blocks 56. Hinge blocks 56 are secured to plate 43 attached to cover portion 40. Second cover 54 is pivotal between a position in covering relationship to the second opening 47, and a position upwardly and out of the way of the second drinking opening 47 to permit access thereto by an animal for purposes of drinking water. The lower outer edge 54A of second cover 54 extends outwardly from the upper edge of the second end wall 16 so as to be engageable by the nose of an animal for movement of the second cover 54 upwardly about the pivot block 56 to a position out of the way so that the animal has access to drinking opening 47.

A bumper assembly, indicated generally at 58, is mounted on plate 43 to limit pivotal movement of first and second covers in open positions and to urge them toward closed positions when an animal has finished watering. An upright post or standard 59 is fixed to the top of plate 43. Post 59 carries a toroidal bumper 60. Bumper 60 is fastened to an interior rim 61 which is in turn secured to a tubular member 62 telescoped over post 59 so that bumper 60 is free to rotate on post 59. Bumper 60 can be formed of a soft pliable material such as rubber. Bumper 60 can be a pneumatic tire.

As shown in phantom in FIG. 3, the pivotal movement of first cover 50 is limited by the outer edge of the bumper 60. When an animal is watering at the first watering opening 44, the first cover 50 is urged in engagement with the bumper 60. Upon release of the first cover 50 by the animal, the bumper 60 resiliently urges the first cover 50 back toward the closed position. Bumper 60 likewise operates on the second cover 54 to urge it back toward the closed position once the animal has finished watering and has left the watering apparatus.

A dam or baffle assembly is provided to reduce heat loss in the winter from the water 27 located in chamber 26 to the surrounding atmosphere and to retard heat gain during hot weather. A first insulated transverse dam or baffle 63 extends downward from the lower surface of top wall 12 in the vicinity of the first shoulder 41 of raised central portion 12 and in the vicinity of the inside edge of first watering opening 44. First baffle 63 extends downwardly into chamber 26 to a location beneath the normal waterline of water 27 or the interface between the water 27 and the air located in the upper part of chamber 26. As shown in FIG. 4, first baffle 63 extends the width of chamber 26 between sidewalls 17, 18 of base 14 in dividing relationship to the first drinking opening 44 and the water inlet 30. Baffle 63, shown in FIG. 4, has downwardly and inwardly inclined sides 66 and 67 located in engagement with inner shell 21 of base 14. A transverse bottom edge 68 extends between sides 66 and 67 below the normal level of water in tank chamber 26. Baffle 63 extends 8 to 10 cm below the normal level of water in tank chamber 26.

A second insulated transverse baffle 64 extends downwardly from the lower surface of top wall 12 in the vicinity of the second shoulder 45 of raised center portion 12 and in the vicinity of the inside edge of the second watering hole 47. Second baffle 64 extends downwardly into the chamber 26 to a location well beneath the normal waterline of water 27, and extends the width of chamber 26 between the sidewalls 17, 18 of base 14 in dividing relationship between second drinking opening 47 and inlet pipe 28. Second baffle 64 is identical to first baffle 63.

The first and second baffles 63, 64 together form upper sub-chambers 26A, 26B, and 26C of chamber 26 which are isolated from one another by the first and second baffles 63, 64. The first sub-chamber 26A is associated with the first drinking opening 44. The second sub-chamber 26B is centrally located and associated with the discharge nozzle 39 of float valve 35, float 37 and water in the surrounding vicinity. The third sub-chamber 26C is associated with the second drinking opening 47. In the winter, water entering through inlet pipe 28 is relatively warmer than the ambient air. When a cover is opened by an animal to drink, for example first cover 50, the surface of the water in sub-chamber 26A is exposed to air at ambient temperature. First baffle 63 inhibits movement of the cold air over the water surface to the water-air interface of the other two sub-chambers 26B and 26C. Likewise, the water-air interface at sub-chamber 26C is isolated from the other two sub-chambers when the second cover 54 is opened. First and second baffles 63, 64 continuously isolate the second sub-chamber 26B, the valve 35 and water in the vicinity from exposure to ambient air thus to isolate the valve assembly 35 and the incoming water through discharge 39. Freezing of the parts of valve assembly 35 is inhibited. In addition, the water circulation made necessary by the baffles 63, 64 in order for water to travel from the discharge 39 down under the lower edges of the baffles and up to the vicinity of the watering openings serves further to inhibit freezing water. In like fashion, during warm weather the baffles 63, 64 serve to retard heat gain to the water from the relatively warmer ambient air.

Figure 5:
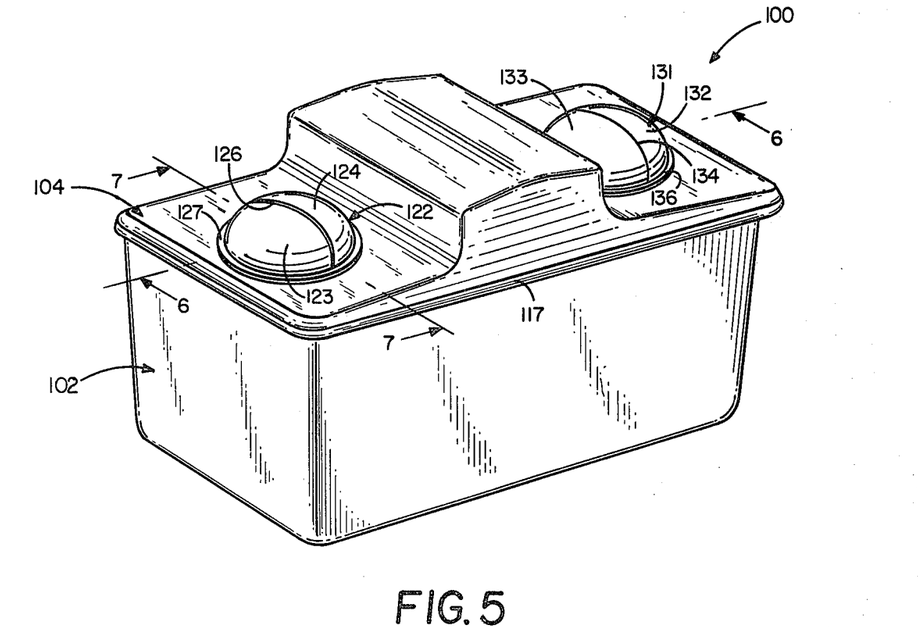
FIG. 5 is a perspective view of a modification of the animal watering apparatus of the invention.
Figure 6:
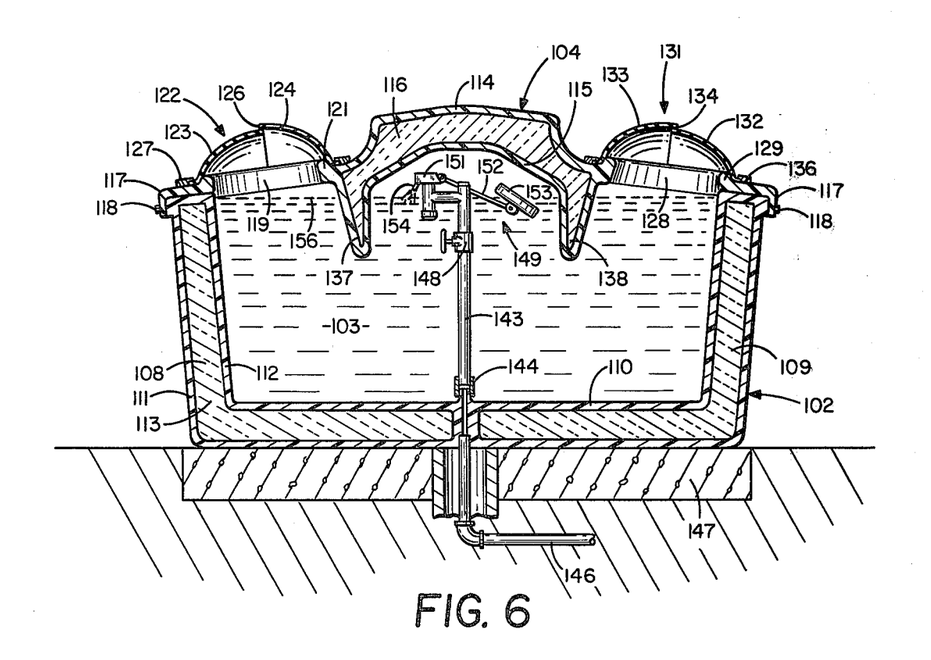
FIG. 6 is a sectional view taken along the line 6—6 of FIG. 5.
Figure 7:
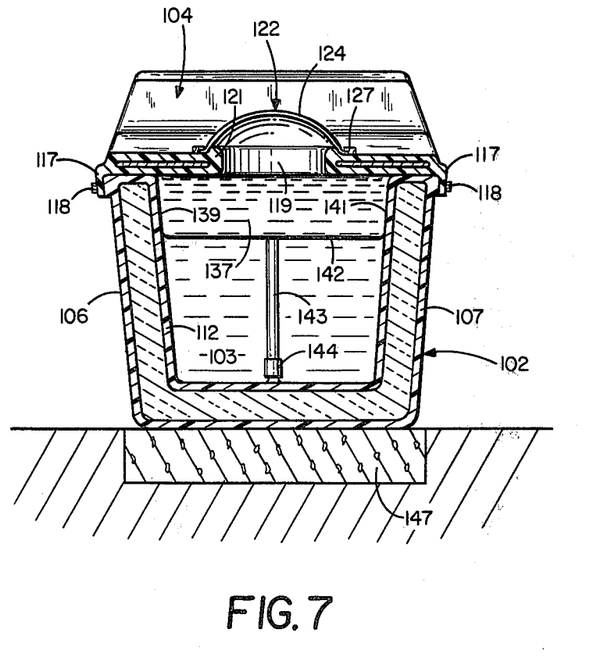
FIG. 7 is a sectional view taken along the line 7—7 of FIG. 5.

Referring to FIGS. 5–7, there is shown a modification of the animal watering apparatus of the invention indicated generally at 100. Apparatus 100 is used to provide a source of drinking water for animals, as cattle and hogs, in both indoor and outdoor environments. The apparatus does not require electricity, gas, or auxiliary heat to keep the water from freezing. The ground water provides sufficient heat to keep the water in the apparatus from freezing.

Apparatus 100 has a tank comprising a generally box-shaped base or bottom unit 102 having a chamber 103 for accommodating a supply of water. The top of base 102 is closed with a top unit indicated generally at 104. Base 102 has upwardly and outwardly inclined sidewalls 106 and 107 joined to end walls 108 and 109. The walls 106–109 are integral with the generally flat bottom wall 110 adapted to be located on a supporting surface, such as a concrete slab 147. The walls 106–110 have outer and inner shells 111 and 112 of plastic reinforced with fibers, such as glass fibers. A heat insulation core 113 is interposed between the shells 111 and 112. Core 113 can be a foam plastic, such as polyurethane or polystyrene foamed plastic. Other types of insulation materials can be used for core 113.

Top unit 104 is a heat insulating laminated structure having an outer shell or skin 114 and an inner shell or skin 115 located on opposite sides of a heat insulating core 116. Shells 114 and 115 are plastic reinforced with fibers, as glass fibers. Core 116 can be foam plastic, such as polyurethane or polystyrene. A downwardly directed flange 117 surrounds top unit 104. Flange 117 fits over the top edge of the side and end walls 106–109 and is secured thereto with a plurality of fasteners 118, such as screws or bolts. Other structures can be used to attach top unit 104 to the bottom unit or base 102.

Top unit 104 has a pair of drinking openings or holes 119 and 128 located on opposite sides of the center portion. An upwardly directed continuous rib 121 surrounds the hole 119. A cover 122 extends over opening 119. Cover 122 has a two section dome comprising a pair of quad-spherical members 123 and 124 having overlapping or meeting edges 126. A ring 127 secures members 123 and 124 to top unit 104. Fasteners, such as screws, are used to secure ring 127 to top unit 104. Members 123 and 124 are made of flexible material, such as rubber, or a flexible plastic. The nose of the animal is used to move members 123 and 124 in a downward direction thereby providing an opening through which the animal can drink the water in chamber 103. When the animal removes its nose from members 123 and 124, they return to their original shape or closed position.

An upwardly directed continuous rib 129 surrounds the second opening 128. A two section domed cover 131 is located over opening 128. Cover 131 comprises two quad-spherical members 132 and 133 having adjacent overlapping edges 134. A ring 136 secured with screws or the like to top unit 104 attaches the members 132 and 133 to top unit 104. Members 132 and 133 are made of flexible rubber-like or plastic materials. An animal can use its nose to flex and move members 132 and 133 to provide access to the water in the chamber 103. When the animal removes its nose from members 132 and 133, they return to their dome shape to close opening 128 from the outside air.

As shown in FIG. 6, a dam or baffle assembly comprising a pair of transverse dams or baffles 137 and 138 are located between openings 119 and 128 and the center portion of the top unit 104. As shown in FIG. 7, baffle 137 has downwardly directed inwardly inclined side edges 139 and 141 located in engagement with inside shell 112. The lower ends of sides 139 and 141 are joined to a transverse bottom edge 142. Bottom edge 142 is located below the normal water level 156 of the water in chamber 103 or the level of the water when the tank chamber 103 is full. The baffle 138 is identical in structure to the baffle 137. The baffles 137 and 138 extend into the top of chamber 103 about 8 to 10 cm. Other baffle widths can be used.

The water is supplied to chamber 103 through a water pipe 143 connected to a portion of the bottom wall 110 with a coupling 144. The bottom of tank 110 is connected to an inlet water supply pipe 146 located under the ground. The upper end of pipe 143 carries an on-off valve 148. Valve 148 can be manually turned on and off. A float valve assembly indicated generally at 149 is secured to the valve 148. Float valve assembly 149 has a valve unit or body 151 for controlling the flow of water from pipe 143 to chamber 103. An arm 152 is secured to the valving unit of body 151. A float 153 is attached to the outer end of arm 151. Body 151 functions to allow water to flow through a discharge nozzle 154 when the level of the water in the tank allows float 103 to move downwardly, thereby actuating the valving element body 151. When the water level reaches a predetermined level, as level 156 in FIG. 6, the float 153 will move arm 152 upwardly, thereby turning body 151 off. The water discharged through nozzle 154 flows under the baffles 137 and 138 into the areas below the openings 119 and 128. Baffles 137 and 138 are air dams that continuously isolate the center portion of the water in chamber 103 and the float valve assembly 149 from the drinking openings 119 and 128. This protects the float valve assembly 149 and water in the center of chamber 103 from the cold or warm air in the drinking openings 119 and 128. The covers 122 and 131 protect the water below the drinking openings 119 and 128 from the ambient air.

While there has been shown and described preferred embodiments of an animal watering apparatus according to the invention, it will be apparent to those skilled in the art that certain deviations may be had from the embodiments shown without departing from the scope and spirit of the invention.

The embodiments of the invention in which an exclusive property or privilege is claimed are defined as follows:

1. An animal watering apparatus comprising: a tank having sidewalls defining a water chamber; a top wall covering said sidewalls and the chamber; a drinking opening in the top wall open to the chamber; cover means normally closing the drinking opening in a closed position and movable to an open position in uncovered relationship to the drinking opening to permit access to the water in the chamber by an animal, said cover means including flexible dome means having at least two members mounted on the top wall, said members being movable relative to each other to an open position providing access to the water in the chamber; water inlet means to the chamber to admit water to the chamber and maintain water at a preselected level in the chamber; baffle means extended downward from the top wall to a location beneath the normal water level and extended between the sidewalls and between the drinking opening and the water inlet means to at least partially isolate the water inlet means from the drinking opening.

2. The apparatus of claim 1 wherein: said tank has sidewalls and end walls, said baffle means extending between sidewalls forming an air seal between the drinking opening and the water inlet means.

3. The apparatus of claim 2 wherein: said tank has a bottom wall, said water inlet means comprising a water pipe extending upwardly through the chamber operable to carry fresh water, a float valve assembly assembled to the water pipe operable to control flow of water to maintain water at said preselected level.

4. An animal watering apparatus comprising: a tank having sidewalls defining a water chamber; a top wall covering said sidewalls and the chamber, a first drinking opening in the top wall open to the chamber; first cover means normally closing the first drinking opening in the closed position and movable to an open position to uncovered relationship to the first drinking opening to permit access to the water in the chamber by an animal; a second drinking opening located in said top wall open to the chamber, second cover means normally closing the second drinking opening in a closed position and movable to an open position in uncovered relationship to the second drinking opening to permit access to water in the chamber by an animal; said first and second cover means each comprising flexible dome means having at least two members mounted on the top wall, said members being movable relative to each other to open positions providing access to the water in the chamber by an animal, water inlet means in the chamber to admit water to the chamber and maintain it at a preselected level in the chamber; first baffle means extended downwardly from the top wall to a location beneath the normal water level and extended between the sidewalls and between the first drinking opening and the water inlet means to isolate the water inlet means from the first drinking opening; and second baffle means extended downwardly from the top wall to isolate the second drinking opening from the water inlet means.

5. The apparatus of claim 4 wherein: said tank has sidewalls and endwalls, said first and second baffle means extended between the sidewalls to form an air seal between the first drinking opening and the water inlet means and another air seal between the second drinking opening and the water intake means.

6. The apparatus of claim 5 wherein: said tank has a bottom wall, said water inlet means including a water pipe extending upwardly in the chamber, a float valve assembly assembled to the water pipe between said first and second baffle means operable to control flow of water to maintain water at said preselected level.

7. An animal watering apparatus comprising: a tank having heat insulated sidewalls and end walls and a bottom wall defining a water chamber; a heat insulated top wall mounted on the sidewalls and end walls to cover the chamber; said top wall having a first drinking opening located toward a first end portion of the top wall and open to the chamber; a first cover normally disposed in covering relationship to the first drinking opening in a closed position and movable by an animal to an open position in uncovered relationship to the drinking opening to permit access to water in the chamber by an animal; means mounting the first cover on the top wall; said top wall having a second drinking opening located toward a second end portion on the top wall open to the chamber; a second cover normally disposed in covering relationship to the second drinking opening in a closed position and movable by an animal to an open position in uncovered relationship to the second drinking opening to permit access to water in the chamber by an animal; means mounting the second cover on the top wall; said first and second covers each comprising flexible dome means having at least two members mounted on the top wall, said members being movable relative to each other to open said dome means providing access to the water in the chamber; water inlet means having a water discharge unit adapted to admit water to the chamber at a location between the first and second drinking openings and maintain the water at a preselected level in the chamber; a first baffle secured to the top wall; said first baffle comprising a transverse heat insulated continuous first member spaced from the first drinking opening, said first member having a linear lower edge and extended downwardly into the chamber location beneath the preselected water level in the chamber and extended between the sidewalls in dividing relationship between the first drinking opening and the water inlet means, said first member having opposite ends engageable with opposite sidewalls of the tank to isolate the water inlet means from the first drinking opening; and a second baffle secured to the top wall and extended downwardly into the chamber, said second baffle comprising a transverse heat insulated continuous second member spaced from the second drinking opening, said second member having a linear lower edge location beneath the preselected water level in the chamber and extended between the sidewalls in dividing relationship between the second drinking opening and the water inlet means, said second member having opposite ends engageable with opposite sidewalls of the tank to isolate the water inlet means from the second drinking opening, said top wall and first and second baffles defining an air chamber accommodating the water discharge unit.

8. The apparatus of claim 7 including: means movably mounting the top wall on said sidewalls and end walls of the tank.

9. The apparatus of claim 7 wherein: said top wall has an inner shell located over said chamber, each of said baffles being integral with said inner shell, each of said baffles having heat insulating means.

10. The animal watering apparatus of claim 7 wherein: said water inlet means includes a water pipe extending upwardly through the chamber operable to carry fresh water, and said water displaying unit includes a float valve assembly assembled to the water pipe between said first and second baffles operable to control flow of water to maintain water at said preselected level.

11. An animal watering apparatus comprising: a tank having sidewalls and end walls and a bottom wall defining a chamber, a top wall mounted on the sidewalls and end walls to cover the chamber, said top wall having a first drinking opening located toward a first end portion of the top wall and open to the chamber, and a second drinking opening located toward a second end portion of the top wall open to the chamber, and a raised center portion located between said first and second end portions, a first cover normally disposed in covering relationship to the first drinking opening in a closed position and movable by an animal to an open position in an uncovered relationship to the first drinking opening to permit access to the water in the chamber by the animal, a second cover normally disposed in covering relationship to the second drinking opening in a closed position and movable by an animal to an open position in uncovered relationship to the second drinking opening to permit access to the water in the chamber by the animal, means hingedly connecting the first cover to the center portion, said first cover having an outer lip extended beyond the first end portion of the top wall when in the closed position for engagement by the nose of an animal to gain access to the first drinking opening, means hingedly connecting the second cover to the center portion, said second cover having an outer lip extended beyond the second end portion of the top wall when in the closed position for engagement by the nose of an animal to gain access to the second drinking opening, a bumper assembly located on the central portion of the top wall to limit the pivotal movement of the first and second covers toward the open position and to urge the first and second covers toward the closed position when the animal moves away from a drinking opening, water inlet means adapted to admit water into the chamber at a location between the first and second drinking openings and maintain the water at a preselected level in the chamber, a first baffle extended downwardly from the top wall to a location beneath the preselected water level in the chamber and extended between the sidewalls in dividing relationship between the first drinking opening and the water inlet means to isolate the water inlet means from the first drinking opening, and a second baffle extended downwardly from the top wall to a location beneath the preselected water level in the chamber and extended between the sidewalls in dividing relationship between the second drinking opening and the water inlet means to isolate the water inlet means from the second drinking opening.

12. The apparatus of claim 11 wherein: said bumper assembly includes an upright standard assembled to the center portion of the top wall; a toroidal bumper of resilient material assembled in a generally horizontal orientation to the upright standard and engageable by the first and second covers when moved toward the open position.

13. An animal watering apparatus comprising: tank means having a chamber for storing water, said tank means having an open top and heat insulated sidewalls, end walls and a bottom wall surrounding the chamber; means located in a first upper section of the chamber for maintaining water in said chamber at a selected level; heat insulated top wall means mounted on the sidewalls and end walls closing the open top of the tank means; said top wall means having at least one drinking opening in communication with a second upper section of the chamber providing animal drinking access to the water in the chamber; cover means for covering the one drinking opening, said cover means having flexible means including at least two flexible members on the top wall means, said members extended over said one drinking opening and being movable by an animal relative to each other to open said flexible means providing access to the water in the chamber; baffle means secured to the top wall means and extended into the water in the chamber to separate the drinking opening from the means for maintaining the water in said chamber, said baffle means comprising a baffle member spaced from at least one drinking opening and extended across the chamber, said baffle member having a lower edge located below the surface of the water in the chamber and end portions located in engagement with inside surfaces of opposite side walls thereby providing an air seal between the first section of the chamber and the second section of the chamber.

14. The apparatus of claim 13 wherein: said top wall means includes an inner shell located over the chamber, said baffle member being integral with said inner shell, said baffle member having heat insulating means.

15. The apparatus of claim 13 including: a second drinking opening in the top wall means in communication with a third section of the chamber, a second baffle means spaced from the second drinking opening extended across the chamber, said second baffle member having a lower edge located below the surface of the water in the chamber and end portions located in engagement with inside surfaces of opposite side walls separating the second drinking opening from the means for maintaining the water in said chamber thereby providing an air seal between the third section of the chamber.

16. The apparatus of claim 15 wherein: said top wall means includes an inner shell located over the chamber, each of said baffle members being integral with said inner shell, each of said baffle members having heat insulating means.

17. The apparatus of claim 13 wherein: the two members have a combined semi-spherical shape.

18. An animal watering apparatus comprising: a tank having side walls defining a water chamber, a top wall covering said side walls and said chamber, a drinking opening in the top wall open to the chamber providing access by the animal to the water in the chamber, cover means normally closing the drinking opening in a closed position, means movably mounting the cover means on said top wall for movement to a closed position over the drinking opening and to an open position in uncovered relationship to the drinking opening by an animal, a bumper assembly mounted on the top wall to limit the movement of the cover means to its open position thereof and to urge the cover means toward the closed position when the animal moves away from the drinking opening, and water inlet means located in the chamber to admit water to the chamber and maintain the water at a preselected level in the chamber.

19. The apparatus of claim 18 wherein: said bumper assembly includes an upright standard mounted on the top wall, a toroidal bumper of resilient material mounted in general horizontal orientation on the upright standard, said bumper being engageable with the cover means when the cover means is moved toward the open position.

20. The apparatus of claim 18 including: baffle means secured to the top wall and extended downwardly therefrom into said chamber to a location below the normal water level in said chamber, said baffle means being spaced from said drinking opening and extended between said side walls of the tank to isolate the water inlet means from the drinking opening.

21. The apparatus of claim 20 wherein: said tank has side walls and end walls, said baffle means comprising a transverse baffle extended between said side walls, said transverse baffle having end portions engageable with said side walls forming an air seal between the drinking opening and the water inlet means.

22. The apparatus of claim 18 wherein: said tank has a bottom wall, said water inlet means comprising a means extended upwardly through the chamber operable to carry water, a float valve assembly mounted on said means operable to control the flow of water through said means to maintain the water at a preselected level in said chamber.

23. An animal watering apparatus comprising: tank means having a chamber for storing water, said tank means having an open top and heat insulated side walls, end walls, and a bottom wall surrounding the chamber, means located in a first upper section of the chamber for maintaining water in said chamber at a selected level, top wall means mounted on the side walls and end walls closing the open top of the tank means, said top wall means having a first drinking opening open to a second section of the chamber and a second drinking opening open to a third section of the chamber thereby providing animal drinking access to the water in the chamber, cover means covering the first drinking opening and second drinking opening and movable by an animal to an open position to provide access to water in the chamber, bumper means mounted on the top wall means to limit movement of the cover means to open positions and allow the cover means to pivot from open positions to closed positions, and baffle means secured to the top wall means and extended into the water into the chamber to separate the first and second drinking openings from the means for maintaining water in said chamber, said baffle means extended between said side walls providing an air seal between the first and second sections of the chamber and the second section of the chamber.

24. The apparatus of claim 23 wherein: said bumper means includes an upright standard mounted on the top wall means, an annular bumper of resilient material assembled in general horizontal orientation on the upright standard and engageable with the cover means when moved toward the open positions, said bumper means urging said first and second cover means toward the closed positions over the first and second drinking openings.

25. An animal watering apparatus comprising: a tank having wall means defining a chamber for accommodating water, a top wall mounted on said wall means covering said chamber, said top wall having a drinking opening open to the chamber providing animal access to the water in the chamber, cover means for closing the drinking opening, means for mounting the cover means on the top wall for movement to an open position in uncovered relationship relative to the drinking opening, and a bumper assembly mounted on the top wall to limit pivotal movement of the cover means toward the open position and urging the cover means toward the closed position when the animal moves away from the drinking opening.

26. The apparatus of claim 25 wherein: said bumper assembly includes an upright standard assembled on the top wall, an annular bumper of resilient material located in general horizontal orientation on the upright standard and engageable by the cover means when moved toward the open position.

27. The apparatus of claim 25 including: baffle means secured to the top wall, said baffle means extended downwardly from the top wall to a location beneath the normal water level, said baffle means having ends located in engagement with the side walls of the wall means of the tank to said baffle means being spaced from said drinking opening and isolating the water inlet means from the drinking opening.

28. The apparatus of claim 27 including: water inlet means in the chamber to admit water to the chamber and maintain water at a preselected level in the chamber.

29. The apparatus of claim 27 wherein: said baffle means comprises a transverse heat insulated continuous first member spaced from the drinking opening, said member having a linear lower edge located beneath the preselected water level in the chamber.

30. The apparatus of claim 27 wherein: said top wall has an inner shell located over said chamber, said baffle means being integral with said inner shell, said baffle means including heat insulating means.

31. An animal watering apparatus comprising: a tank having heat insulated side walls and end walls and a bottom wall defining a water chamber, a heat insulated top wall mounted on the side walls and end walls to cover the chamber, said top wall having a first drinking opening located toward a first end portion of the top wall and open to the chamber, a first cover normally disposed in covering relationship to the first drinking opening in the closed position and movable by an animal to an open position in uncovered relationship to the drinking opening to permit access to water in the chamber by an animal, means mounting the first cover on the top wall, said top wall having a second drinking opening located toward a second end portion of the top wall open to the chamber, a second cover normally disposed in covering relationship to the second drinking opening in a closed position and movable by an animal to an open position in uncovered relationship to the second drinking opening to permit access to water in the chamber by an animal, means mounting the second cover on the top wall, and a bumper assembly located on the top wall to limit pivotal movement of the first and second covers toward the open position and to urge the first and second covers toward the closed position when the animal moves away from the apparatus.

32. The apparatus of claim 31 wherein: said bumper assembly includes an upright standard mounted on the top wall, an annular bumper of resilient material mounted on said standard and engageable by the first and second covers when moved toward the open positions thereof.

33. The apparatus of claim 31 including first and second baffles mounted on the top wall extended into the water chamber, each of said first and second baffles includes a transverse heat insulated continuous member, said member having a linear lower edge located beneath the preselected water level in the water chamber and opposite ends engageable with the opposite side walls of the tank.

* * * * *

UNITED STATES PATENT AND TRADEMARK OFFICE
CERTIFICATE OF CORRECTION

PATENT NO. : 4,343,264
DATED : August 10, 1982
INVENTOR(S) : Kenneth L. Schafer et al.

It is certified that error appears in the above-identified patent and that said Letters Patent are hereby corrected as shown below:

Column 10, line 11, "means" should be -- member --.

Signed and Sealed this

First Day of March 1983

[SEAL]

Attest:

GERALD J. MOSSINGHOFF

Attesting Officer

Commissioner of Patents and Trademarks